Oct. 14, 1924.  1,511,318
K. BERGER
PRESSURE REGULATING VALVE
Filed Jan. 8, 1923    2 Sheets-Sheet 1

INVENTOR
Knute Berger
BY
Frank Warren
ATTORNEY

Oct. 14, 1924.

K. BERGER 1,511,318

PRESSURE REGULATING VALVE

Filed Jan. 8, 1923　　2 Sheets-Sheet 2

INVENTOR
*Knute Berger*
BY
*Frank Warren*
ATTORNEY

Patented Oct. 14, 1924.

1,511,318

UNITED STATES PATENT OFFICE.

KNUTE BERGER, OF SEATTLE, WASHINGTON.

PRESSURE-REGULATING VALVE.

Application filed January 8, 1923. Serial No. 611,280.

*To all whom it may concern:*

Be it known that I, KNUTE BERGER, a citizen of the United States, residing at Seattle, in the county of King and State of Washington, have invented a certain new and useful Improvement in Pressure-Regulating Valves, of which the following is a specification.

My invention relates to improvements in automatic variable pressure regulating valves and an object of my improvement is to provide a pressure regulation that may be quickly and easily adjusted or set for any desired pressure and that will operate automatically after it is set to maintain said pressure substantially constant.

Another object is to provide a pressure regulation that will automatically permit the pressure on one side of the valve to exhaust when the valve is completely closed.

A further object is to provide a pressure regulator that may be connected with auxiliary valve devices in such a manner as to regulate the flow of any fluid through said auxiliary valve devices.

Still further objects are to provide a pressure regulator that is strong and durable in construction, accurate and reliable in operation, inexpensive to manufacture and is comparatively simple and easy to adjust.

Other and more specific objects will be apparent from the following description.

I accomplish these objects by devices illustrated in the accompanying drawings, wherein—

Figure 2:
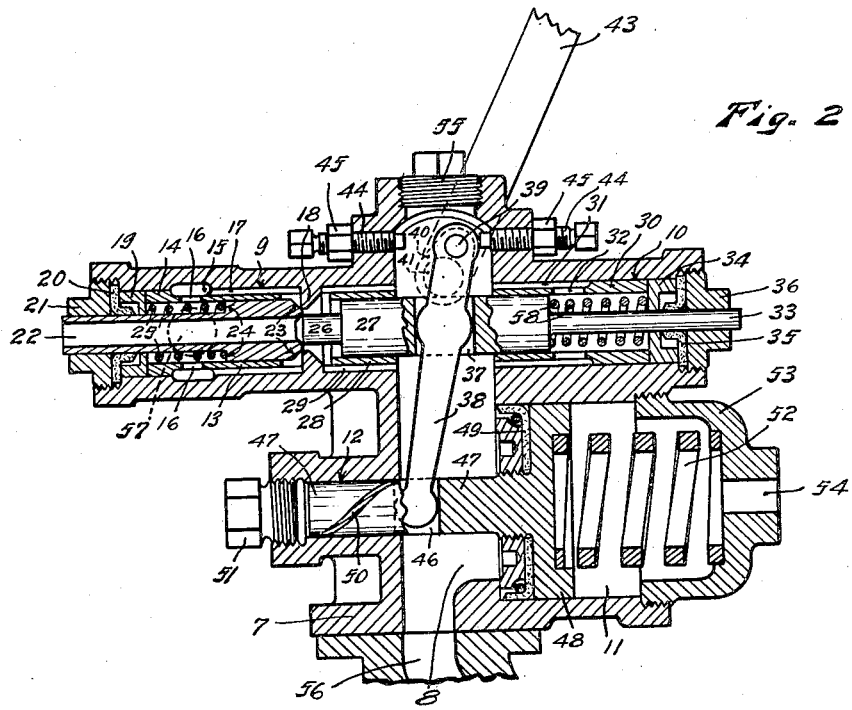
Fig. 2 is a view in vertical mid-section of the same substantially on line 2, 2 of Fig. 1.
Figure 1:
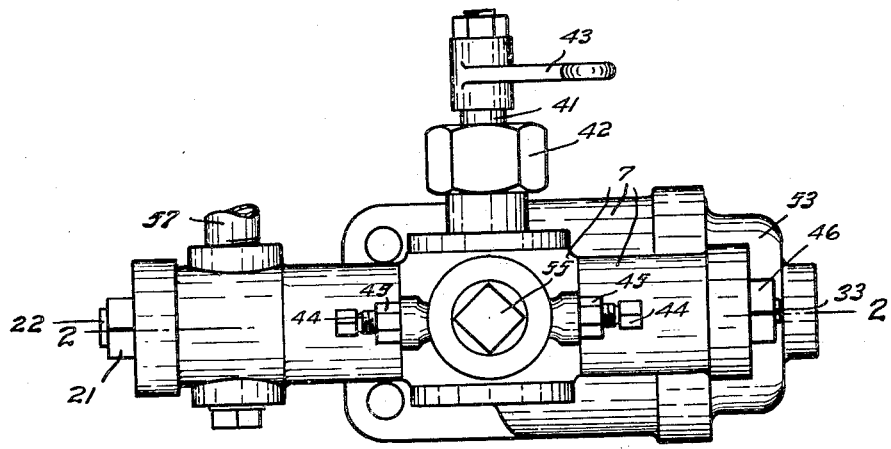
Figure 1 is a plan view of a pressure regulator valve constructed in accordance with my invention.

Referring to the drawings throughout which like reference numerals indicate like parts, the numeral 7 designates the body portion of a pressure regulator, said body portion being provided with a normally vertical passageway or pressure chamber 8 and having normally horizontal passageways 9, 10, 11 and 12 that intersect the pressure chamber 8 at right angles thereto. The passageways 9 and 10 are of substantially the same diameter and are disposed in axial alignment with each other so that they form a valve chamber extending entirely across the valve. The passageway 11 form a piston chamber and is of relatively large diameter and is axially aligned with the smaller passageway 12 which serves as a guide for parts hereinafter explained.

Figure 5:
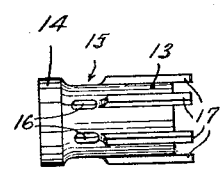

Disposed within the valve chamber passageway 9 is a tubular bushing 13, as shown in Fig. 5, having a solid outer end 14, adjacent which is an externally disposed annular groove 15 having perforations 16 affording a passageway between the exterior and interior of the bushing. The inner end of the bushing 13 is externally provided with spaced ribs 17 that extend lengthwise thereof and afford passageways therebetween through which fluid, as gas or air may flow.

The ribs 17 project beyond the inner end of the bushing 13, as shown, and are arranged to abut against a shoulder formed by an annular valve seat 18 that may be integral with the valve housing 7.

The bushing 13 is retained within the passageway 9 by a cup-shaped washer 19, packing ring 20 and nut 21.

A fluid inlet pipe 57 is connected with the passageway 9 for admitting fluid, as air or gas, under pressure to the area surrounding the bushing 13.

A tubular valve member 22 is disposed within the bushing 13, said valve member having an enlarged inner end that fits the interior of the bushing 13 and having a smaller shank that extends outwardly through the nut 21. A conical tip 23 arranged to engage the valve seat 18 is provided at the inner end of the enlarged portion of the valve member 22 and a shoulder 24 is provided at the outer end of such portion and arranged to receive the thrust of a compression spring 25 that tends to hold the tubular valve member closed.

The passageway through the tubular valve member is adapted to be closed by a valve 26 on the end of a stem 27 that is reciprocably disposed in the passageways 8 and 10 and extend crosswise of the pressure chamber 8. A bushing 28 having external ribs 29ᵐ similar to the ribs 17 on the bushing 13, is provided in the passageway 9 for the reception of one end of the stem 27 and a bushing 30 having external ribs 31 and having perforations 32 in the walls thereof is provided in the passageway 10 for the reception of the other end of the stem 27.

The end of the stem 27 opposite the valve 26 is provided with a shank 33 that extends outwardly through a cup-shaped washer 34, packing washer 35 and nut 36. A compression spring 58 is interposed between the end of the stem 27 and the cup-shaped washer 34.

A slot 37 is provided in that portion of the stem 27 that is normally within the passageway 8 and a lever arm 38 is arranged to extend through said slot 37. The upper end of the lever arm 38 is pivoted on a pin 39 on a crank arm 40 that is formed on the end of a rocker shaft 41, said shaft 41 extends outwardly through a packing gland 42 in the side of the housing 7 and is provided on the exterior of the housing with a lever arm 43 by which the crank arm may be moved between the extreme positions shown in Figs. 2 and 3 respectively. Adjustable tap screws 44 having lock nuts 45 are provided for limiting the movement of the upper end of the lever arm 38 in both directions.

The lower end of the lever arm 38 projects into a slot 46 in a shank or stem 47 that is rigidly connected with a piston 48 which is reciprocably disposed in the chamber 11. The piston 48 is provided on the side adjacent the pressure chamber 8 with a cup-shaped washer 49 that prevents the escape of fluid, as air or gas, from the pressure chamber.

The end of the shank 47 opposite the piston 48 is guided for reciprocating movement in the passageway 12 and such end is provided with one or more grooves 50 or with other equivalent means for permitting a free flow of air or gas. The outer end of the passageway 12 is preferably closed by a plug 51.

A helical compression spring 52 is interposed between the outer side of the piston 48 and a cap 53 that screws into the outer end of the piston chamber 11 and a perforation 54 is provided in the cap 53 to insure uniform atmospheric pressure on the outer side of the piston 48.

A plug 55 may be inserted in the upper end of the pressure chamber 8 and the bottom end of such pressure chamber may be connected with any suitable receptacle 56 wherein a constant pressure is to be maintained.

In operation air or gas under pressure is admitted through the pipe 57 into the space surrounding the bushing 13. If the lever 43 is in the position shown in Fig. 2 the end 23 of the valve member 22 will rest against the seat 18 thereby closing the valve. If the lever 43 is moved to the left the valve 26 and stem 27 will be moved to the left thereby moving the tubular valve member 22 to the left and withdrawing the end 23 of the same from the seat 18 so that air or gas may flow through the valve seat 18 past the bushing 28 and through the pressure chamber 8 into the receptacle 56.

As soon as the pressure in the chamber 8 is sufficient to begin to compress the spring 52 the lower end of the lever arm 38 will be moved to the right and the passageway through the valve seat 18 will be partially or entirely closed until the pressure in the chamber 8 begins to grow less whereupon the piston 48 will be moved to the left by the pressure of the spring 52 and the valve member 22 will again be moved to the left to admit more air or gas under pressure.

The opening of the tubular valve member 22 with respect to the valve seat 18 is determined by the position of the lever 43 which is manually controlled and the position of the piston 48 which is automatically controlled. The piston 48 will always tend to assume a position of equilibrium in which the pressure of the spring 52 just balances or equalizes the fluid pressure in the chamber 8 and the pressure or resistance of the spring 52 will increase in accordance with well known laws as the same is compressed. Consequently the pressure in the chamber 8 may be regulated by adjustment of the lever 43. For instance, if the lever 43 is moved a short distance to the left from the position shown in Fig. 2 the valve 22 will only be opened slightly and, as soon as the pressure in the passageway 8 is sufficient to move the piston 48 to the right against the relatively light pressure of the spring 52 the valve 22 will begin to close and will assume such a position as to maintain a relatively low constant pressure in the passageway 8 and in the receptacle 56 that is connected therewith. If the lever 43 is moved a greater distance to the left the tubular valve 22 will be moved further away from the seat 18 and will require a greater movement of the piston 48 to close the same, consequently necessitating more compression of the spring 52 which will require a greater pressure in the chamber 8.

I find it is possible with this valve, when the spring 52 is properly proportioned and adjusted, to secure any desired pressure between the minimum required to move the piston 48, which may be very low, and the maximum which is the pressure in the pipe 57.

If the lever 43 being in an open or partially open position is moved toward a closed position the valve 22 will be closed and the valve member 26 will be withdrawn from the end of the valve member 22 thus permitting the pressure in the chamber 8 and container 56 to exhaust through the tubular valve 22. As the pressure in the chamber 8 decreases the piston 48 will be moved toward the left thus closing the exhaust passageway through the valve 22 when the pressure has been reduced as much as desired and if the pressure falls below the desired amount opening the passageway through the valve seat 18.

By cutting the grooves 50 in the stem 47 the area is reduced but the pressure in both directions inside of the grooves 50 equalizes hence there is no tendency to move the piston in either direction due to the grooves 50. The grooves however permit the pressure to get behind the end of the stem 47 which acts as an independent piston.

Pressure of the compressed fluid against the end 23 of the valve 22 will be counterbalanced by pressure against the shoulder 24 and in a similar manner pressure against the two ends of the stem 27 will offset each other, the valve member 26 and shank 33 being of the same diameter.

Figure 3:
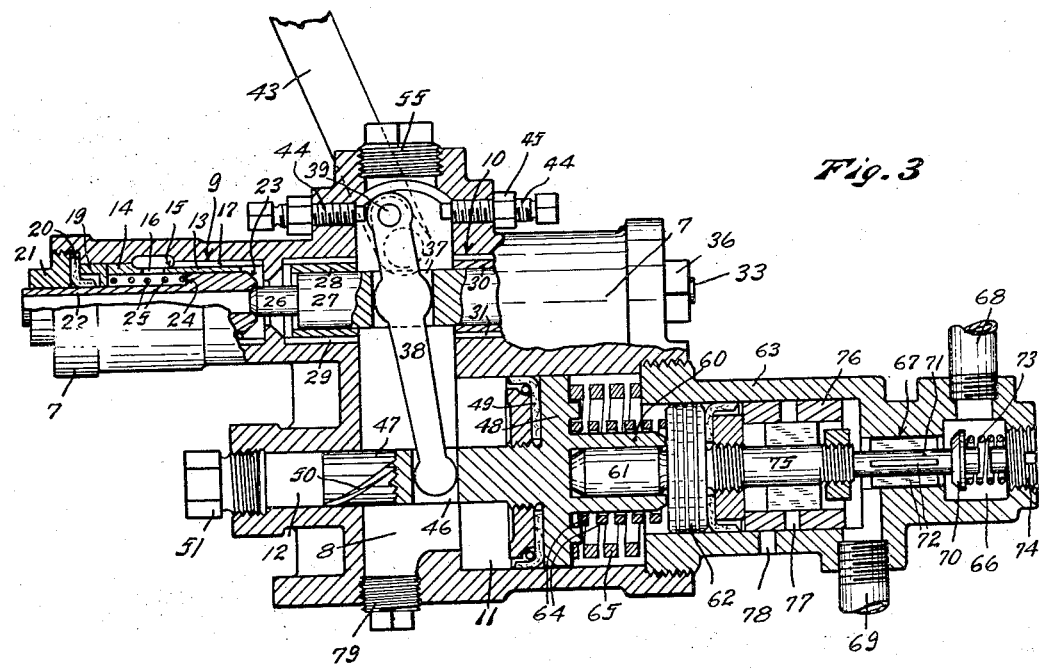
Fig. 3 is a view in vertical mid-section showing auxiliary valve mechanism connected with and arranged to be operated by the automatic variable pressure regulator.
Figure 4:
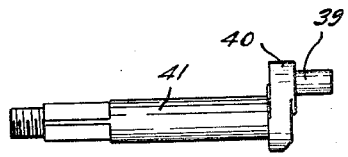
Figs. 4 and 5 are detached views in elevation of two different details of my invention.

In Fig. 3 I have shown this pressure regulator connected with auxiliary valve means for opening and closing the same. In this Fig. 3 the piston 48 is provided on its outer side with an outwardly protruding axially arranged tubular socket 60 for the reception of a stem 61 on a piston 62 that is reciprocably disposed in a cylindrical housing 63 which is arranged to screw into the end of the piston chamber 11 in place of the cap 53. A compression spring 64 is interposed between the piston 48 and the piston 62 to urge the piston 62 outwardly and a stronger compression spring 65 is interposed between the piston 48 and the end of the housing 63 to function in the same manner as the spring 52 hereinbefore described.

The housing 63 terminates at its outer end in a valve chamber 66 that is connected by a passageway 67 with the main chamber in the housing 63.

An intake pipe 68 is connected by the valve chamber 66 and an outlet pipe 69 is connected with the main chamber in the housing 63. A valve 70 arranged to close the outlet from the chamber 66 through the passageway 67 is disposed in the chamber 66 and provided with a stem 71 that is guided for longitudinal movement in the passageway 67. The stem 71 is provided with outwardly protruding ribs 72 that fit within the passageway 67 or is otherwise formed so that fluid may pass freely through the passageway 67. A compression spring 73 is interposed between the outer side of the valve 70 and a plug 74 that is screwed into the end of the valve housing to exert a yielding pressure on the valve 70.

The piston 62 has an outwardly protruding stem 75 that is arranged to engage with the end of the stem 71 to open the valve 70. Mounted on the stem 75 and slidable within the housing 63 is a cylindrical slide valve 76 having a port 77 that is arranged to register with another port 78 in the housing 63.

In the apparatus shown and described in connection with Fig. 3 the flow of fluid through the pipes 68 and 69 is governed by the pressure regulator. If the lever 43 is moved to the wide open position, as shown, the relatively high pressure in the chamber 8 will move the piston 48 to the right and open the valve 70 wide. If a lower pressure is maintained in the chamber 8 the valve 70 may be partially or entirely closed.

When the valve 70 is entirely closed the port 77 in the slide valve 76 will register with the port 78 in the housing 63 and compressed air or gas in the housing 63 and in the pipe 69 will be permitted to escape. As the piston 62 is moved toward the right the ports 77 and 78 will move out of registration before the valve 70 begins to open thereby precluding the escape of air or gas except when the valve is closed.

When the pressure regulator is used in connection with the valve attachment just described the opening at the lower end of the chamber 8 may be closed by a plug 79.

The foregoing description and accompanying drawings clearly disclose the plan of construction and method of operation of my invention but while I have shown and described what I now consider a preferred embodiment of my invention it will be understood that the drawings are merely illustrative and that such changes in the same may be made as are within the spirit of the invention.

What I claim is:

1. A pressure regulator valve embodying a valve housing, a valve member in said valve housing, a lever arm controlling the movement of said valve member, manually operated devices adjustably supporting one end of said lever arm, and pressure operated means connected with the other end of said lever arm.

2. A pressure regulator of the class described embodying a body portion, a valve member arranged to control the flow of fluid through said body portion, a lever arm controlling the opening and closing movement of said valve member, manually operated devices adjustably supporting one end of said lever arm, and yielding means governed by the pressure within said regulator body portion for supporting the other end of said lever arm.

3. A pressure regulator of the class described embodying a body portion having a pressure chamber, a valve controlling the flow of fluid into said pressure chamber, a lever arm in said pressure chamber, means governed by the fluid pressure within said pressure chamber for yieldingly supporting one end of said lever arm, manually operated devices adjustably supporting the other end of said lever arm and means connected with said lever arm between the two ends thereof for opening and closing said valve.

4. A pressure regulator embodying a body portion having a pressure chamber, a piston chamber and a valve chamber, a valve in said valve chamber for controlling the flow of fluid into said pressure chamber, a lever arm in said pressure chamber, manually operated means adjustably supporting one end of said lever arm, a piston in said piston chamber one side of said piston being exposed to the pressure in said pressure chamber, a spring yieldingly supporting the other end of said piston, means connecting the other end of said lever arm with said piston and means connected with said lever arm between the two ends thereof for opening and closing said valve.

5. A pressure regulator valve embodying a valve body portion having a pressure chamber and a valve chamber, a valve seat in said valve chamber, a valve arranged to rest on said valve seat, said valve having an exhaust passageway extending therethrough, stem means in said valve chamber for engaging said valve to open and close said exhaust passageway and to move said valve away from said valve seat, a lever arm connected with said stem, means for moving said stem, manually operated means adjustably supporting one end of said lever arm, and means arranged to be automatically operated by pressure within said pressure chamber for yieldingly supporting the other end of said lever arm.

6. A pressure regulator valve embodying a valve body portion having a pressure chamber and having a valve chamber and a piston chamber that intersects said pressure chamber, pressure inlet means connected with said valve chamber, a valve seat in said valve chamber, a tubular valve arranged to yieldingly rest upon said valve seat, a stem in said valve chamber for engaging the end of said tubular valve, a lever arm engaging with said stem, manually operated means adjustably supporting one end of said lever arm, a piston disposed in said piston chamber and having one side exposed to the pressure in said pressure chamber, means connected with said piston for engaging the other end of said lever arm, and a spring yieldingly supporting said piston.

7. A pressure regulator valve embodying a valve body having a pressure chamber extending therethrough and having a valve chamber that intersects said pressure chamber, a valve seat in said valve chamber, pressure inlet means connected with said valve chamber, a tubular valve in said valve chamber and arranged to engage said seat, a stem in said valve chamber said stem having means for engaging said tubular valve to open and close the passageway therethrough and to move said valve away from said valve seat, a lever arm in said pressure chamber and connected with said stem for moving the same, manually operated means for adjustably supporting one end of said lever arm, pressure operated piston means for yieldingly supporting the other end of said lever arm, and auxiliary valve mechanism arranged to be opened and closed by the movement of said pressure operated piston means.

8. A pressure regulator valve embodying a valve body having a pressure chamber extending therethrough and having a valve chamber and a piston chamber each arranged at right angles and intersecting said pressure chamber, a valve seat in said valve chamber, a tubular valve movable in said valve chamber into and out of engagement with said valve seat, pressure inlet means connected with said valve chamber, a stem in said valve chamber for moving said tubular valve into an open or closed position, a lever arm in said pressure chamber and connected with said stem for moving the same, manually operated means for adjustably supporting one end of said lever arm, a piston movable in said piston chamber, a stem on said piston extending into said pressure chamber, the other end of said lever arm being connected with said piston, and a spring yieldingly supporting said piston against pressure from within said pressure chamber.

9. A pressure regulator valve embodying a valve body having a pressure chamber extending therethrough and having two passageways that intersect said pressure chamber at right angles thereto, a valve seat in one of said passageways, a tubular valve in said passageway and arranged to rest on said valve seat, means for admitting fluid under pressure to said passageway, a stem disposed in said passageway and extending across said pressure chamber, a valve member on the end of said stem for engaging the end of said tubular valve to close the opening therethrough and to move said tubular valve member, means for yieldingly urging said stem toward said tubular valve member, a lever arm disposed in said pressure chamber and connected with said stem for moving the stem endwise, an operating rod extending through the side of said valve body, a manually operated lever arm on the other end of said operating rod, a crank arm on the inner end of said operating rod, a crank pin on said crank arm and arranged to form an adjustable fulcrum for one end of said lever arm, a piston operatively disposed in one of said passageways, a stem on said piston arranged to extend across said pressure chamber one end of said lever arm being connected with said stem and a spring yieldingly supporting said piston against pressure within said pressure chamber.

10. A variable automatic pressure regulator valve embodying a main valve body portion provided with a pressure chamber, a valve chamber and a piston chamber, a valve in said valve chamber controlling the flow of fluid into said pressure chamber, a lever arm in said pressure chamber, manually operated means adjustably supporting one end of said lever arm, a piston in said piston chamber, means connected with said piston for adjustably supporting the other end of said lever arm, a spring yieldingly supporting said piston against pressure in said pressure chamber, means connected with said lever arm between the two ends thereof for opening and closing said valve, an auxiliary valve housing connected with said piston chamber, fluid inlet and outlet means connected with said auxiliary valve housing, a valve controlling the flow of fluid through said auxiliary valve housing, means governed by the movement of said piston for opening and closing said valve, and exhaust means arranged to be open only when said valve is closed.

In witness whereof, I hereunto subscribe my name this 30th day of December, A. D. 1922.

KNUTE BERGER.